US010417254B2

(12) United States Patent
Cao et al.

(10) Patent No.: US 10,417,254 B2
(45) Date of Patent: Sep. 17, 2019

(54) INTELLIGENT CONTENT SYNCHRONIZATION BETWEEN CONTENT LIBRARIES

(71) Applicant: VMware, Inc., Palo Alto, CA (US)

(72) Inventors: Yanping Cao, San Carlos, CA (US); Kirill Uvaev, Santa Clara, CA (US); Mahdi Ben Hamida, Foster City, CA (US)

(73) Assignee: VMware, Inc., Palo Alto, CA (US)

( * ) Notice: Subject to any disclaimer, the term of this patent is extended or adjusted under 35 U.S.C. 154(b) by 371 days.

(21) Appl. No.: 15/012,785

(22) Filed: Feb. 1, 2016

(65) Prior Publication Data

US 2017/0220660 A1    Aug. 3, 2017

(51) Int. Cl.
*G06F 3/06* (2006.01)
*G06F 11/20* (2006.01)
*G06F 16/27* (2019.01)
*G06F 16/178* (2019.01)

(52) U.S. Cl.
CPC .......... *G06F 16/273* (2019.01); *G06F 3/0605* (2013.01); *G06F 3/065* (2013.01); *G06F 3/067* (2013.01); *G06F 11/2082* (2013.01); *G06F 16/178* (2019.01)

(58) Field of Classification Search
CPC .... G06F 3/065; G06F 16/273; G06F 11/2082; G06F 16/178; G06F 3/067
USPC .............................. 707/610, 634, 637, 640
See application file for complete search history.

(56) References Cited

U.S. PATENT DOCUMENTS

| 6,247,135 | B1 * | 6/2001 | Feague | .................. H04L 69/24 |
| | | | | 707/999.201 |
| 2005/0216524 | A1 * | 9/2005 | Gomes | .............. G06F 17/30578 |
| 2006/0195666 | A1 * | 8/2006 | Maruyama | ............ G06F 3/0613 |
| | | | | 711/162 |
| 2007/0192386 | A1 * | 8/2007 | Fries | ................... G06F 11/1451 |

(Continued)

OTHER PUBLICATIONS

VMware Inc., "Using vCloud Connector", published on Nov. 25, 2014, retrieved from http://pubs.vmware.com/hybridcloud-27/topic/com.vmware.ICbase/PDF/vCloudConnector_27_UsingvCC.pdf accessed through https://www.vmware.com/support/pubs/hybridcloud_pubs.html with 2.7.0 release noted as Nov. 13, 2014.*

*Primary Examiner* — David T. Brooks
(74) *Attorney, Agent, or Firm* — Loza & Loza, LLP

(57) ABSTRACT

A cluster management system and method for synchronizing content libraries within a distributed computer system uses multiple replication processes to synchronize a subscribed content library with a publishing content library, which includes at least a consumable software item and metadata of the consumable software item. If the consumable software item of the publishing content library can be replicated at the subscribed content library using a first data replication process, then the consumable software item of the publishing content library is replicated at the subscribed content library using the first data replication process. If the consumable software item of the publishing content library cannot be replicated at the subscribed content library using the first data replication process, the consumable software item of the publishing content library is replicated at the subscribed content library using a second data replication process.

25 Claims, 6 Drawing Sheets

(56) References Cited

U.S. PATENT DOCUMENTS

| | | | |
|---|---|---|---|
| 2010/0223400 A1* | 9/2010 | McCarthy | G06F 17/30575 |
| | | | 709/248 |
| 2013/0290952 A1* | 10/2013 | Childers, Jr. | G06F 9/5077 |
| | | | 718/1 |
| 2014/0250235 A1* | 9/2014 | Bradley | H04N 21/2407 |
| | | | 709/231 |
| 2014/0373011 A1* | 12/2014 | Anderson | G06F 9/45533 |
| | | | 718/1 |
| 2016/0364404 A1* | 12/2016 | Newhouse | G06F 17/30575 |
| 2016/0380840 A1* | 12/2016 | Karve | H04L 41/20 |
| | | | 709/223 |

* cited by examiner

INTELLIGENT CONTENT SYNCHRONIZATION BETWEEN CONTENT LIBRARIES

BACKGROUND

Virtualization allows computer resources, such as processors, computer memories, network bandwidth and data storage facilities, to be shared among resource-consuming processing entities, e.g., virtual machines (VMs), running on a distributed computer system. This sharing of computer resources can increase efficiency by reducing maintenance and operating costs, allowing flexibility with respect to individual resource usage, and simplifying resource management. With respect to shared storage, the benefits include data consolidation, universal access to data, ease of storage management, and support for live migration of virtualized environments.

The resource-consuming processing entities can be used to form virtual data centers and other processing clusters to perform various tasks and operations. Administrators and users of these data centers and processing clusters need to efficiently manage different aspects of the data centers and processing clusters, which may involve using consumable software contents, such as virtual machine and application templates. Typically, these consumable software contents are stored in local or remote datastores that can be accessed to anyone with administrative rights to the data centers or processing clusters and their datastores. This presents a security issue since anyone with access to a data center or processing cluster and its datastore can also freely access the consumable software contents stored in the datastore, and, for example, initiate unauthorized build of resource-consuming processing entities using the consumable software contents. In addition, sharing these consumable software contents between different administrators and users can be tedious and time-consuming since the consumable software contents may be stored in numerous datastores. Furthermore, in order to share consumable software contents between different administrators and users, the consumable software contents may have to be transmitted to datastores associated with different requesting parties, which may require significant bandwidth and transmission time.

SUMMARY

A cluster management system and method for synchronizing content libraries within a distributed computer system uses multiple replication processes to synchronize a subscribed content library with a publishing content library, which includes at least a consumable software item and metadata of the consumable software item. If the consumable software item of the publishing content library can be replicated at the subscribed content library using a first data replication process, then the consumable software item of the publishing content library is replicated at the subscribed content library using the first data replication process. If the consumable software item of the publishing content library cannot be replicated at the subscribed content library using the first data replication process, the consumable software item of the publishing content library is replicated at the subscribed content library using a second data replication process.

A method for synchronizing content libraries within a distributed computer system in accordance with an embodiment of the invention comprises receiving a trigger signal to initiate a content synchronization of a subscribed content library in the distributed computer system with a publishing content library in the distributed computer system, the publishing content library including at least a consumable software item and metadata of the consumable software item, determining whether the consumable software item of the publishing content library can be replicated at the subscribed content library using a first data replication process from a plurality of data replication processes, if the consumable software item of the publishing content library can be replicated at the subscribed content library using the first data replication process, replicating the consumable software item of the publishing content library at the subscribed content library using the first data replication process, and if the consumable software item of the publishing content library cannot be replicated at the subscribed content library using the first data replication process, replicating the consumable software item of the publishing content library at the subscribed content library using a second data replication process of the plurality of data replication processes. In some embodiments, the steps of this method are performed when program instructions contained in a computer-readable storage medium are executed by one or more processors.

A management server supported by hardware in a distributed computer system in accordance with an embodiment of the invention comprises memory and a processor, when program instructions in the memory are executed, is configured to receive a trigger signal to initiate a content synchronization of a subscribed content library in the distributed computer system with a publishing content library in the distributed computer system, the publishing content library including at least a consumable software item and metadata of the consumable software item, determine whether the consumable software item of the publishing content library can be replicated at the subscribed content library using a first data replication process from a plurality of data replication processes, if the consumable software item of the publishing content library can be replicated at the subscribed content library using the first data replication process, replicate the consumable software item of the publishing content library at the subscribed content library using the first data replication process, and if the consumable software item of the publishing content library cannot be replicated at the subscribed content library using the first data replication process, replicate the consumable software item of the publishing content library at the subscribed content library using a second data replication process of the plurality of data replication processes.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
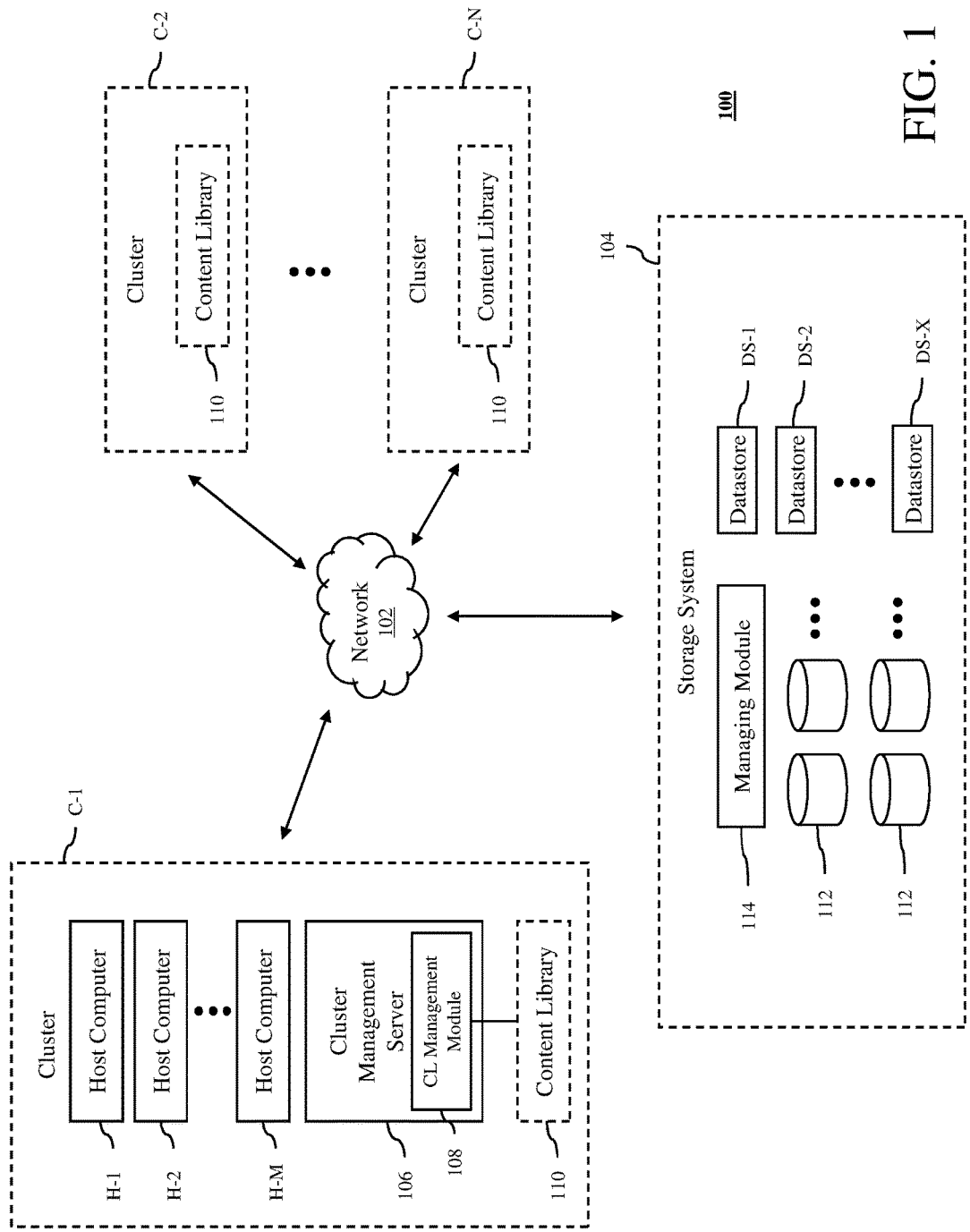
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system includes a network 102, clusters C-1, C-2 . . . C-N (where N is a positive integer) of host computers and a storage system 104. The clusters of host computers are used to support or host multiple processing entities that can execute various applications. As used herein, the term "processing entity" is any software entity that can run on a computer system, such as a software application, a software process, a virtual machine (VM) and a "container" that provides system-level process isolation. One or more of the clusters of host computers may be grouped to form and function as a data center. The number of clusters included in the distributed computer system may be in the hundreds or more. Thus, the distributed computer system may include multiple data centers. The host computers of the different clusters may be connected to the storage system 104 via the network 102. Thus, each of the host computers in the clusters is able to access the storage system via the network and may share the resources provided by the storage system. Consequently, any process running on any of the host computers in the distributed computer system may also access the storage system via the network.

In the illustrated embodiment, each of the clusters C-1, C-2 . . . C-N includes a number of host computers H-1, H-2 . . . H-M (where M is a positive integer) and a cluster management server 106. The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have a different number of host computers. The host computers are physical computer systems that host or support one or more processing entities so that the processing entities are executing on the physical computer systems. The host computers may be servers that are commonly found in data centers. As an example, the host computers may be servers installed in one or more server racks. In an embodiment, the host computers of a cluster are located within the same server rack.

Figure 2:
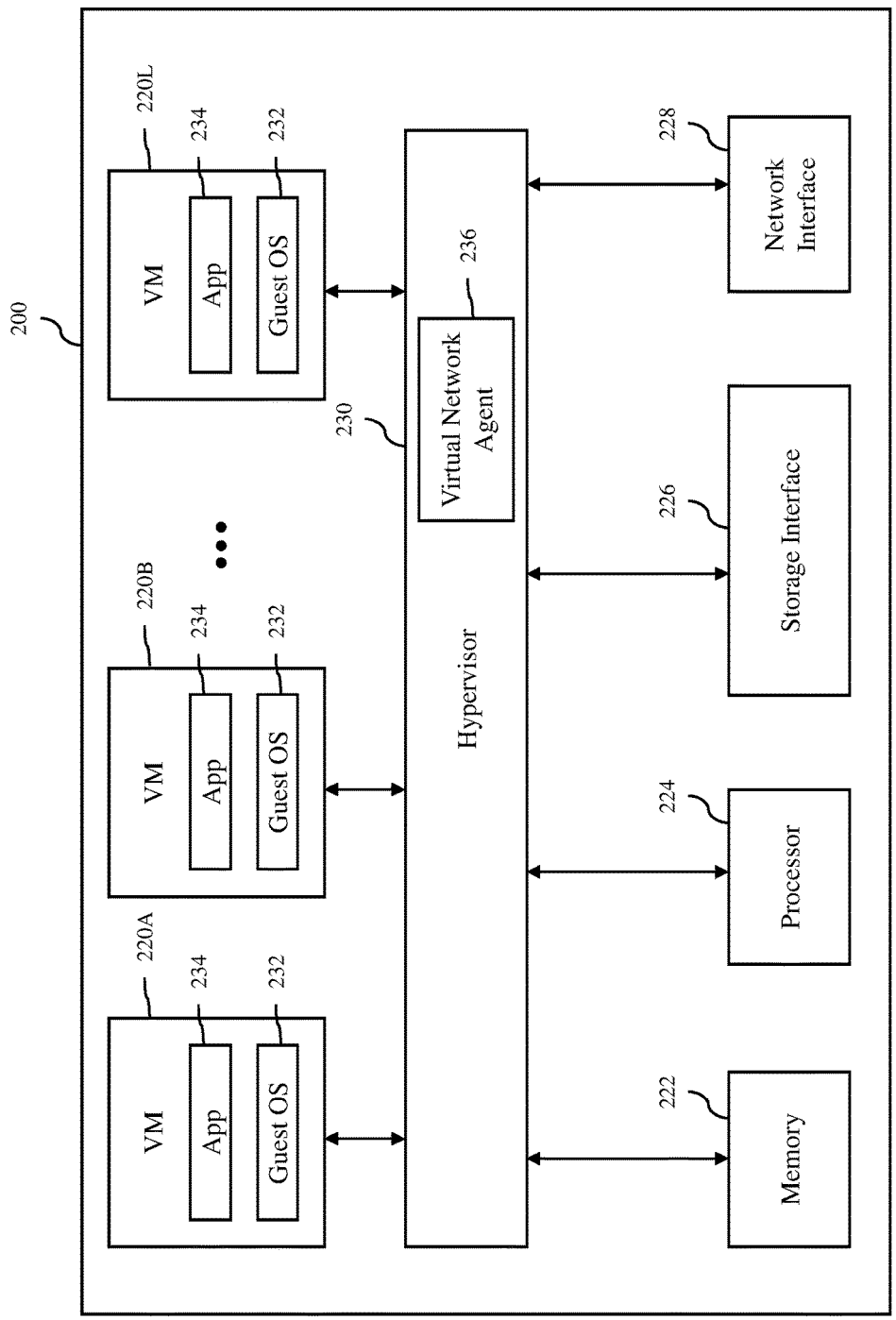
FIG. 2 is a block diagram of a host computer in accordance with an embodiment of the invention.

Turning now to FIG. 2, components of a host computer 200 that is representative of the host computers H-1, H-2 . . . H-M in the clusters C-1, C-2 . . . C-N in accordance with an embodiment of the invention are shown. In FIG. 2, the physical connections between the various components of the host computer are not illustrated. In the illustrated embodiment, the host computer is configured to support a number of processing entities 220A, 220B . . . 220L (where L is a positive integer), which are VMs in this embodiment. The number of VMs supported by the host computer can be anywhere from one to more than a hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide virtualized computer systems that give the appearance of being distinct from the host computer and from each other. Each VM includes a guest operating system (OS) 232 and one or more guest applications (APP) 234. The guest operating system manages virtual system resources made available to the corresponding VM by the hypervisor 230, and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 may include a virtual network agent 236, which operates within the hypervisor 230 to provide virtual networking capabilities, such as bridging, L3 routing, L2 switching and firewall capabilities, so that software defined networks or virtual networks can be created. In a particular embodiment, the virtual network agent 236 may be part of a VMware NSX™ virtual network product installed in the distributed computer system 100.

Turning back to FIG. 1, each of the cluster management servers 106 in the clusters C-1, C-2 . . . C-N operates to monitor and manage the host computers H-1, H-2 . . . H-M in the respective cluster. Each cluster management server may be configured to monitor the current configurations of the host computers and the processing entities, e.g., VMs, running on the host computers in the respective cluster. The monitored configurations may include hardware configuration of each of the host computers, such as CPU type and memory size, and/or software configurations of each of the host computers, such as operating system (OS) type and installed applications or software programs. The monitored configurations may also include processing entity hosting information, i.e., which processing entities are hosted or running on which host computers. The monitored configurations may also include processing entity information. The processing entity information may include size of each of the processing entities, virtualized hardware configuration of each of the processing entities, such as virtual CPU type and virtual memory size, software configuration of each of the processing entities, such as OS type and installed applications or software programs running on each of the processing entities, and virtual storage size for each of the processing entities. The processing entity information may also include resource parameter settings, such as demand, limit, reservation and share values for various resources, e.g., CPU, memory, network bandwidth and storage, which are consumed by the processing entities. The "demand," or current usage, of the processing entities for the consumable resources, such as CPU, memory, network, and storage, are measured by the host computers hosting the processing entities and provided to the respective cluster management server.

In some embodiments, the cluster management servers 106 may be physical computers with each computer including at least memory and one or more processors, similar to the host computer 200. In other embodiments, the cluster management servers may be implemented as software programs running on physical computers, such as the host computer 200 shown in FIG. 2, or virtual computers, such as the VMs 220A, 220B . . . 220L. In an implementation, the cluster management servers are VMware® vCenter™ servers with at least some of the features available for such servers.

In the illustrated embodiment, each of the cluster management servers 106 includes a content library (CL) management module 108, which is configured to create and manage one or more content libraries 110. A content library is a repository for consumable software items, such as virtual machine (VM) templates and virtual application (vApp) templates, as well as other software items, such as ISO files, scripts and text files, for example. A VM template is a master image of a virtual machine that can be used to create new virtual machines. This image typically includes an operating system, applications and configuration settings for the virtual machine. A vApp template is a VM image that is loaded with an operating system, applications and data. vApp templates ensure that virtual machines are consistently configured across an entire organization. Thus, consumable software items can be software items that are used to clone, convert or deploy processing entities. A content library may be a publishing content library, which functions as a source of software items for other content libraries that are subscribed to the publishing content library, i.e., subscribed content libraries. A subscribed content library is a content library that allows the users of the subscribed content library to easily access and use the software items of the publishing content library to which the subscribed content library is subscribed. A single publishing content library may have multiple subscribed content libraries. Thus, the use of content libraries in the distributed computer system 100 easily allows users to share and use software items, in particular the consumable software items. The content library management module 108 and content libraries are further described below.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage system 104 is used to store data for the host computers of the clusters C-1, C-2 . . . C-N, which can be accessed like any other storage device connected to computer systems. In an embodiment, the storage system can be accessed by entities, such as the cluster management servers 106, including their content library management modules 108, and the processing entities running on the host computers, using any file system, e.g., virtual machine file system (VMFS) or network file system (NFS). The storage system 104 includes one or more computer data storage devices 112, which can be any type of storage devices, such as solid-state devices (SSDs), hard disks or a combination of the two. At least some of these storage devices may be local storage devices of the host computers, e.g., locally attached disks or SSDs within the host computers. The storage devices 112 may operate as components of a network-attached storage (NAS) and/or a storage area network (SAN). The storage may include one or more storage managing modules 114, which manage the operation of the storage system. In an embodiment, each storage managing module 114 is a computer program executing on one or more computer systems (not shown) of the storage. The storage system supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage system. The datastores are used to store data associated with the processing entities supported by the host computers of the clusters. The same datastore may be associated with more than one cluster. For VMs, the datastores may be used to store virtual storage, e.g., virtual disks, used by each of the VMs, as well as other files needed to support the VMs, such as configuration files for the VMs. In addition, the datastores may be used to store snapshots of processing entities, e.g., VMs, which may include some or all of the files of the processing entities. Furthermore, the datastores may be used to store content libraries 110 created and managed by the content library management modules 108, as well as the contents of the content libraries. One or more datastores may be associated with one or more host computers. Thus, each host computer is associated with at least one datastore. Some of the datastores may be grouped into one or more clusters of datastores, which are commonly referred to as storage pods.

Turning back to the content library management modules 108, each of these content library management modules is configured or programmed to support a content library feature in which one or more content libraries 110 can be created and maintained for the corresponding cluster. When a content library is created by a user using a content library management module, the content library can be configured to be a publishing content library so that one or more other content libraries can subscribe to the publishing content library. The publishing content library may be configured so that a password or other verification is required for other content libraries to subscribe to the publishing content library. The publishing content library typically includes one or more software items, which may include consumable software items, and metadata of the software items (sometimes referred to herein as "item metadata"). In an embodiment, the consumable software items may be stored as Open Virtualization Format (OVF) file format. The item metadata includes information regarding the software items, such as identification of the software item, creation date of the software item, software item type, name of library to which the software item belong, description of the storage item, version of the storage item, file uniform resource locator (URL) of the storage item and storage location of the software item. The item metadata may be stored as one or more files in the publishing content library that can be replicated and synchronized at any subscribed content library. In an embodiment, the item metadata may be stored as one or more JavaScript Object Notation (JSON) files. However, in other embodiments, the item metadata may be stored in the content library in any format or structure.

Alternatively, when a content library 110 is created by a user using a content library management module 108, the content library can be configured to subscribe to a publishing content library so that the created content library can be a subscribed content library to the publishing content library. The publishing and subscribed content libraries may be created using the same content library management module in a cluster management server or different content library management modules in other cluster management servers. For a subscribed content library, the content library management module that created that subscribed content library manages synchronization of the subscribed content library with the publishing content library to which that subscribed content library is subscribed.

The synchronization process of a subscribed content library to a publishing content library involves synchronizing the subscribed content library so that the item metadata and all the software items in the publishing content library are present in the subscribed content library. After a subscribed content library is created, the item metadata and all the software items in the publishing content library are replicated or downloaded to the subscribed content library. After this initial synchronization, subsequent synchronization processes of the subscribed content library to the publishing content library may be performed to re-synchronize the subscribed content library with the publishing content library, which may have changes with respect to the item metadata and the software items stored in the publishing content library. Typically, the item metadata in a publishing content library is not large in size. For example, the item metadata for a publishing content library may be less than one (1) megabyte in size, such as two (2) Kilobytes. However, the software items in a publishing content library can be significantly large in size. For example, a single consumable software item, such as a VM template, may be larger than one (1) gigabyte in size. Thus, downloading software items from a publishing content library to a subscribed content library for synchronization may require significant cost with respect to bandwidth and/or time.

In order to reduce the bandwidth and/or time requirement for synchronizing a subscribed content library with respect to the software items in a publishing content library, the content library management module associated with the subscribed content library initiates data replication of the needed software item(s) from the publishing content library to the subscribed content library using one of at least two data replication (copying/downloading/transmitting) processes in which one of the data replication processes is more efficient than the other data replication process with respect to bandwidth and/or time. When a software item in the publishing content library needs to be replicated at the subscribed content library for synchronization, the content library management module will check and see if that software item can be replicated using the most efficient data replication process. If it is possible to use the most efficient data replication process, then the software item in the publishing content library is replicated at the subscribed content library using the most efficient data replication process. However, if it is not possible to use the most efficient data replication process, the content library management module will check and see if that software item can be replicated using the second most efficient data replication process.

If it is possible to use the second most efficient data replication process, then the software item in the publishing content library is replicated at the subscribed content library using the second most efficient data replication process. However, if it is not possible to use the second most efficient data replication process, the content library management module will either attempt to use another data replication, if there is one, or abort the synchronization process, which may be presented to an administrator or user as an error.

Figure 3A:
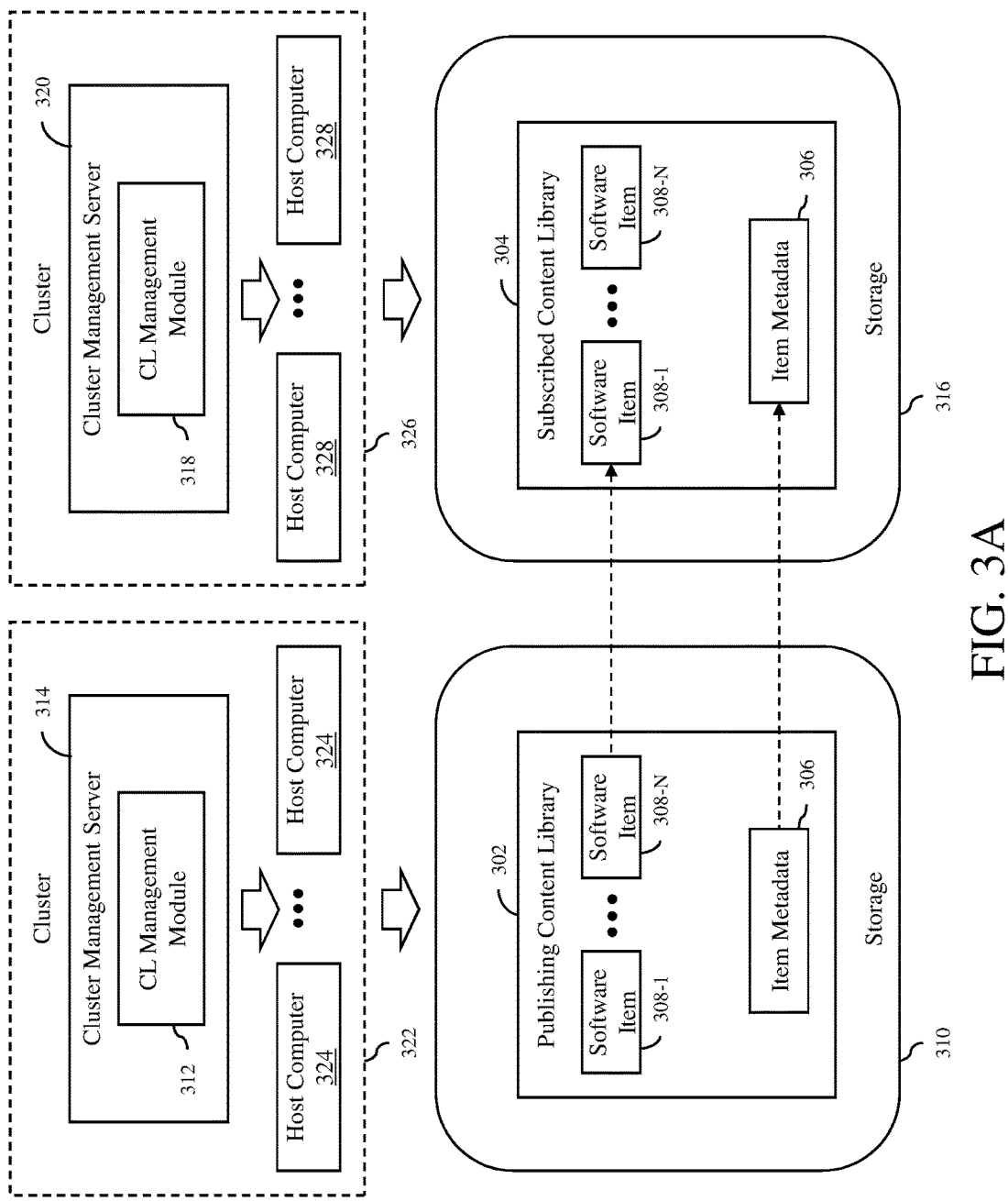
FIG. 3A illustrates an initial synchronization process of a subscribed content library with a publishing content library in accordance with an embodiment of the invention.

FIG. 3A illustrates an initial synchronization process of a subscribed content library 304 with a publishing content library 302 to which the subscribed content library is subscribed in accordance with an embodiment of the invention. In this example, there are two data replication processes to replicate data in the publishing content library 304 at the subscribed content library. These data replication processes are a storage copy process and a data streaming process based on Hypertext Transfer Protocol (HTTP), which is a less efficient data replication process with respect to bandwidth and/or time as compared to the storage copy process. As shown in FIG. 3A, the subscribed content library 302 is stored in storage 310 and is associated with a content library management module 312 in a cluster management server 314, which is connected to the storage 310. Similarly, the subscribed content library 304 is stored in storage 316 and is associated with a content library management module 318 in a cluster management server 320, which is connected to the storage 316. As used herein, a content library management module being connected to a particular storage means that data stored in that particular storage is accessible by the connected content library management module, and thus, that storage is used to store the contents of the content library created and managed by the connected content library management module. The storages 310 and 316 are part of the storage system 104 shown in FIG. 1, and each storage may include one or more storage devices that can support one or more datastores. The content library management module 312 is located in a cluster 322 with host computers 324 and the content library management module 318 is located in another cluster 326 with host computers 328.

As shown in FIG. 3A, the publishing content library 302 includes item metadata 306 and multiple software items 308-1 . . . 308-N (where N is an integer greater than 1), which may include consumable software items, such as VM templates and vApp templates. For the initial synchronization process, the item metadata 306 is first downloaded or replicated from the publishing content library 302 to the subscribed content library 304, for example, using a synchronization mechanism for JSON files. However, in other embodiments, other techniques may be used to download the item metadata 306 from the publishing content library 302 to the subscribed content library 304. Using the storage location information in the item metadata for the software items in the publishing content library, the content library management module 318 performs an intelligent check to see if storage copy is available to execute a storage copy process in which the software items of the publishing content library stored in the storage associated with the publishing content library can be copied directly to the storage associated with the subscribed content library. As an example, storage copy may not be available if the content management module 318 cannot access the storage 310 containing the publishing content library 302 via any of the host computers 328 in the cluster 326. There may be other reasons why storage copy may not be available, such as connectivity issues.

If the storage copy process is available, the content library management module 318 delegates the storage copy process to a pair of host computers, one of the host computers 328 in the cluster 326 and one of the host computers 324 in the cluster 322. This delegation process may involve communications between the content library management module 318 and the content library management module 312 to control the pair of host computers. In a particular implementation, the storage copy process may be delegated to the host computer in the cluster 326 that is physically closest to the storage 316 and the host computer in the cluster 322 that is physically closest to the storage 310. The storage copy process is then performed by the pair of host computers, which involve retrieving the software items 308-1 . . . 308-N in the publishing content library 302 stored in the storage 310 by the selected host computer 324 in the cluster 322 and then transmitting the software items to the selected host computer 328 in the cluster 326, which then stores the received software items in the subscribed content library 304 stored in the storage 316. In an embodiment, the storage copy process may be VMware's proprietary network file copy (NFC) process. However, in other embodiments, the storage copy process may a storage copy process that is executed at the storage system level without the involvement of any host computers in either clusters.

However, if the storage copy process is not available, the content library management module 318 selects the other less efficient data replication process, i.e., the data streaming process based on HTTP. Thus, the data streaming process based on HTTP is used as a fallback data replication process in this example. In an embodiment, the data streaming process based on HTTP involves an HTTP Secure (HTTPS) request being transmitted from the cluster management server 314 to the cluster management server 320 to initiate data streaming of the software items 308-1 . . . 308-N in the publishing content library 302 stored in the storage 310. In response, the cluster management server 314 establishes an HTTP(S) connection with the other cluster management server 320 and streams the software items from the storage 310 to the storage 316 via the cluster management servers 314 and 320.

When compared to VMware's NFC process, the data streaming process based on HTTP is significantly less efficient. Both of these processes use Transmission Control Protocol (TCP) based protocol. However, the transfer route using the NFC process is reduced by two hops (i.e., one of the host computers 324 in the cluster 322 to the content library management module 312 and one of the host computers 328 in the cluster 326 to the content library management module 318). In addition, the NFC process does not perform encoding/decoding for file transfer and has no proxy, which can speed up file transfer, usually twice as fast as the data streaming process based on HTTP. Furthermore, the NFC process provides optimal transfer for virtual machine disks, i.e., VMDK disks, with built-in optimization. In particular, the NFC process can transform VMDK disk formats on the fly. This can boost transfer performance significantly since VMDK disks are usually large and the disk transformation at the content library service layer will be slower than at the NFC layer.

Once the subscribed content library 304 has been synchronized with the publishing content library 302, the subscribed content library may be re-synchronized with the publishing content library automatically at predetermined periods or manually in response to user input. Alternatively, the subscribed content library may be re-synchronized with the publishing content library automatically when the contents of the publishing content library have been changed.

Figure 3B:
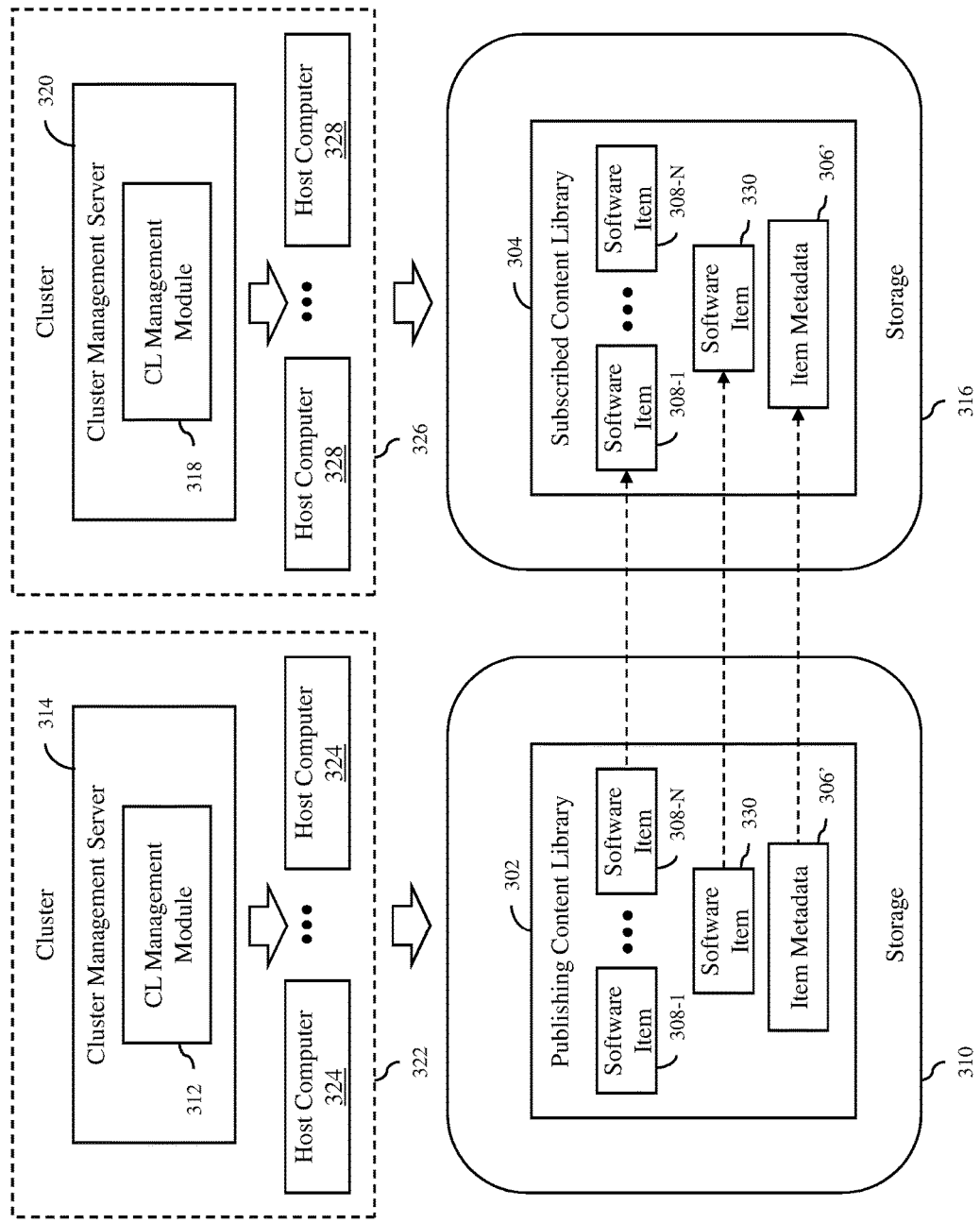
FIG. 3B illustrates a re-synchronization process of a subscribed content library with a publishing content library in accordance with an embodiment of the invention.

FIG. 3B illustrates a re-synchronization process of the subscribed content library 304 with the publishing content library 302 in accordance with an embodiment of the invention. In this example, a new software item 330 has been added to the publishing content library 302 shown in FIG. 3A. In addition, one or more of the software items 308-1 . . . 308-N in the publishing content library 304 may have been modified since the previous synchronization process. Consequently, the item metadata in the publishing content library has been changed from the item metadata 306 to item metadata 306'. For the re-synchronization process, the item metadata 306 in the subscribed content library 304 is first synchronized with the item metadata 306' in the publishing content library 302 to the subscribed content library 304. Using the storage location information in the item metadata 306' for the software items in the publishing content library 302, the content library management module 318 performs an intelligent check to see if storage copy is available to execute a storage copy process in which the new software item 330 and the modified software items of the publishing content library 302 can be copied directly to the subscribed content library 304 using host computers in the clusters 322 and 326.

If the storage copy process is available, the content library management module 318 delegates the storage copy process to a pair of host computers, one of the host computers 328 in the cluster 326 and one of the host computers 324 in the cluster 322. The storage copy process is then performed by the host computers to copy the new software item 330 and the modified software items from the publishing content library 302 to the subscribed content library 304.

However, if the storage copy process is not available, the content library management module 318 selects the data streaming process based on HTTP. The data streaming process based on HTTP is then performed between the cluster management servers 314 and 320 to stream the new software item and the modified software items from the publishing content library 302 to the subscribed content library 304.

The data replication process selection for content synchronization of a subscribed content library with a publishing content library in accordance with embodiments of the invention allows the synchronization to be performed more efficiently with respect to bandwidth and/or time when more efficient data replication process is available for the synchronization. Thus, the synchronization processes of a subscribed content library with a publishing content library are performed in the most efficient manner possible.

Figure 4:
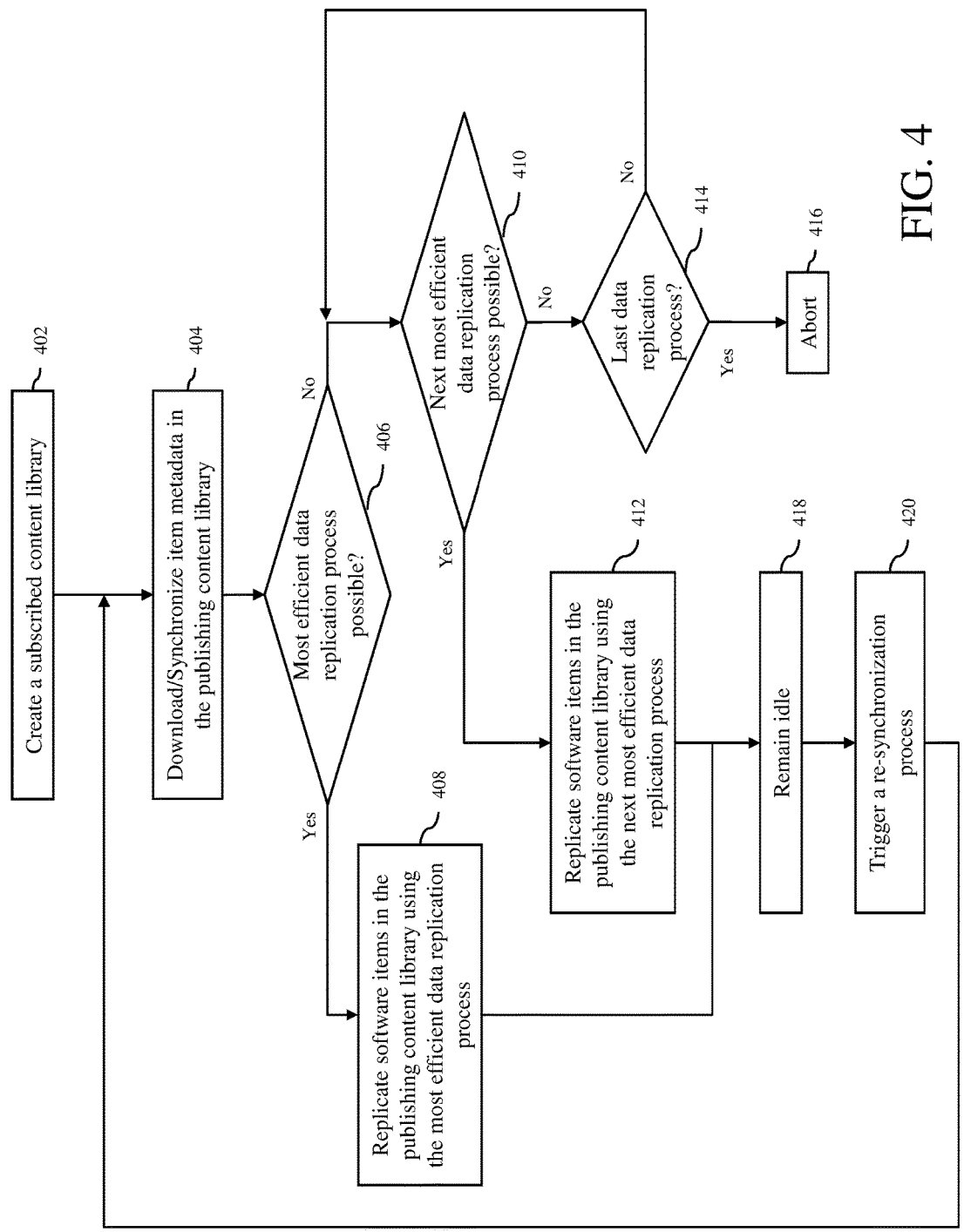
FIG. 4 is a flow diagram of an operation of the distributed computer system with respect to subscribed content libraries in accordance with an embodiment of the invention.

The overall synchronization operation of the distributed computer system 100 with respect to content libraries in accordance with an embodiment of the invention is described with reference to a flow diagram of FIG. 4. At block 402, in response to user input at a cluster management server 106 in the distributed computer system, a subscribed content library associated with that cluster management server is created by the content library management module 108 of that cluster management server. As part of this creation step, the subscribed content library is subscribed to a publishing content library, which can be associated with the same cluster management server or another cluster management server in the distributed computer system. In a particular implementation, the subscribed content library may be subscribed to the publishing content library using a pointer, such as a uniform resource locator (URL), to the publishing content library.

As a result of the subscribed content library being subscribed to the publishing content, an initial synchronization process is performed. At block 404, the item metadata in the publishing content library is downloaded or synchronized to the subscribed content library using a synchronization mechanism between the publishing and subscribed content libraries. Next, at block 406, using the item metadata, a determination is made by the content library management module of the subscribed content library to determine if the most efficient data replication process can be performed to transmit the software item(s) in the publishing content library to the subscribed content library. For the initial synchronization process, all the software items in the publishing content library would need to be transmitted or copied to the subscribed content library. For subsequent synchronization or re-synchronization processes, only new and modified software items in the publishing content library would need to be transmitted or copied to the subscribed content library.

If the most efficient data replication process can be performed, then the most efficient data replication process is used to replicate the software items in the publishing content library at the subscribed content library, at block 408. The operation then proceeds to block 418 However, if the most efficient data replication process cannot be performed, a determination is made to determine if the next most efficient data replication process can be can be performed to transmit the software items in the publishing content library to the subscribed content library, at block 410.

If the next most efficient data replication process can be performed, then the next most efficient data replication process is used to replicate the software items in the publishing content library at the subscribed content library, at block 412. The operation then proceeds to block 418. However, if the next most efficient data replication process cannot be performed, a determination is made to determine if this is the last possible data replication process that can be used for content library synchronization, at block 414. If the current data replication process is the last data replication process, the operation is aborted, and an error message may be presented to the user, at block 416. However, if the current data replication process is not the last possible data replication, the operation proceeds back to block 410 to see if the next most efficient data replication process can be performed. This iterative process is continued until a data replication process is used to transmit the software items in the publishing content library to the subscribed content library or until the operation is aborted.

After the initial synchronization process, the operation remains idle, at block 418, until a re-synchronization process is triggered, at block 420. The re-synchronization process may be triggered by user input or may be triggered automatically based on a timer or some event, such as a notification that the contents of the publishing content library have changed. The operation then proceeds back to block 406 to performed the re-synchronization process in a similar manner as the initial synchronization process. The only significant difference between these two synchronization processes is that all the software items in the publishing content library do not necessarily have to be downloaded to the subscribed content library for re-synchronization process. Rather, only new and recently modified software items in the publishing content library need to be downloaded to the subscribed content library.

The re-synchronization process on the subscribed content library may be repeated as long as the subscribed content library is active or until the subscribed content library is deleted. In some embodiments, further re-synchronization processes on the subscribed content library may be stopped by user input.

In an embodiment, if a data replication process fails before completing the replication the software items in the publishing content library at the subscribed content library, another data replication process may be used to perform the content synchronization, if possible. In the example illustrated in FIG. 3A, if the storage copy process fails before completion, then the data stream process based on HTTP may be used to try to transmit the software items 308-1 . . . 308-N from the publishing content library 302 to the subscribed content library 304.

In some embodiments, the above-described process of trying to synchronize the contents of a subscribed content library to the contents of the publishing content library using the most efficient replication process may be for each individual software items in the publishing content library that needs to be replicated at the subscribed content library. In these embodiments, during a synchronization process, some of the software items in the publishing content library may be replicated at the subscribed content library using a particular data replication process, e.g., a storage copy process, while other software items in the publishing content library may be replicated at the subscribed content library using other data replication processes, e.g., a data streaming process based on HTTP.

Figure 5:
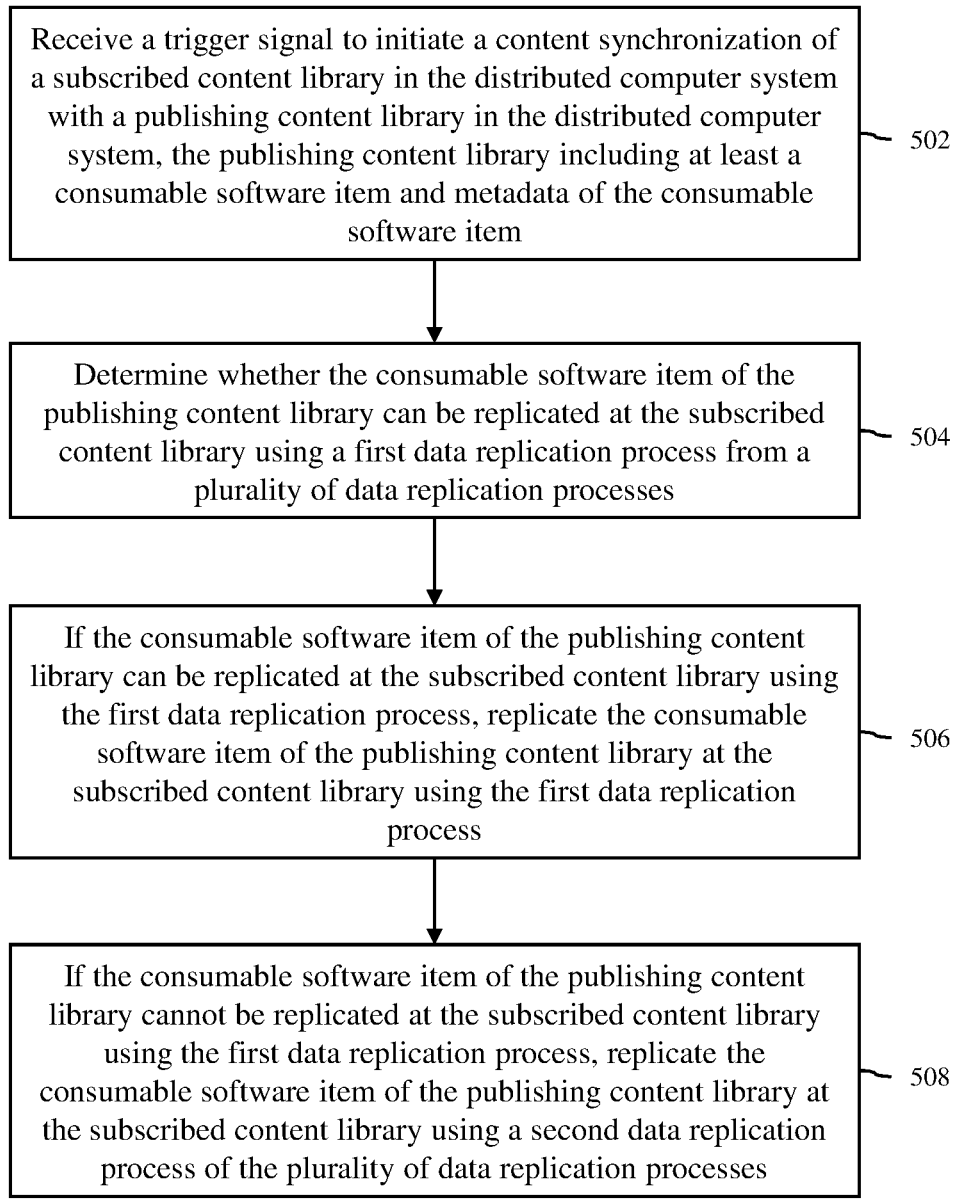
FIG. 5 is a flow diagram of a method for synchronizing content libraries within a distributed computer system in accordance with an embodiment of the invention.

A method for synchronizing content libraries within a distributed computer system in accordance with an embodiment of the invention is described with reference to a flow diagram of FIG. 5. At block 502, a trigger signal to initiate a content synchronization of a subscribed content library in the distributed computer system with a publishing content library in the distributed computer system is received. The publishing content library includes at least a consumable software item and metadata of the consumable software item. The trigger signal may indicate an event, such as a content library being subscribed to a publishing content library, contents of a publishing content library being changed or an initiation of a re-synchronization process. At block 504, a determination is made whether the consumable software item of the publishing content library can be replicated at the subscribed content library using a first data replication process from a plurality of data replication processes. At block 506, if the consumable software item of the publishing content library can be replicated at the subscribed content library using the first data replication process, the consumable software item of the publishing content library is replicated at the subscribed content library using the first data replication process. At block 508, if the consumable software item of the publishing content library cannot be replicated at the subscribed content library using the first data replication process, the consumable software item of the publishing content library is replicated at the subscribed content library using a second data replication process of the plurality of data replication processes.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for synchronizing content libraries within a distributed computer system, the method comprising:
   receiving a trigger signal to initiate a content synchronization of a subscribed content library in the distributed computer system with a publishing content library in the distributed computer system, the publishing content library including at least a consumable software item and metadata of the consumable software item;
   based on the metadata, determining whether the consumable software item of the publishing content library can be replicated at the subscribed content library using the most efficient data replication process from a plurality of data replication processes;
   if the consumable software item of the publishing content library can be replicated at the subscribed content library using the most efficient data replication process, replicating the consumable software item of the publishing content library at the subscribed content library using the most efficient data replication process;
   if the consumable software item of the publishing content library cannot be replicated at the subscribed content library using the most efficient data replication process, replicating the consumable software item of the publishing content library at the subscribed content library using the next most efficient data replication process of the plurality of data replication processes; and
   performing a re-synchronization process between the subscribed content library and the publishing content library by synchronizing a metadata in the subscribed content library with a metadata of an updated consumable software item of the publishing content library and using storage location information in the metadata of the updated consumable software item to determine whether the updated consumable software item of the publishing content library can be replicated at the subscribed content library using the most efficient data replication process.

2. The method of claim 1, wherein the most efficient data replication process is a storage copy process to copy the consumable software item of the publishing content library stored in first storage to second storage associated with the subscribed content library.

3. The method of claim 2, wherein determining whether the consumable software item of the publishing content library can be replicated at the subscribed content library using the most efficient data replication process includes determining whether a cluster management server associated with the subscribed content library has access to the first storage in which the consumable software item of the publishing content library is stored.

4. The method of claim 1, wherein the next most efficient data replication process is a data streaming process based on HTTP to stream the consumable software item from the publishing content library to the subscribed content library.

5. The method of claim 1, further comprising, if replication of the consumable software item at the subscribed content library fails using the most efficient data replication process, replicating the consumable software item of the publishing content library at the subscribed content library using the next most efficient data replication process.

6. The method of claim 1, wherein the consumable software item is a virtual machine template.

7. The method of claim 1, wherein the consumable software item is a virtual application template.

8. The method of claim 1, wherein the consumable software item is stored in the publishing content library as Open Virtualization Format (OVF) file format.

9. The method of claim 1, wherein the metadata of the consumable software item is stored in the publishing content library and the subscribed content library as one or more JavaScript Object Notation (JSON) files.

10. A non-transitory computer-readable storage medium containing program instructions for synchronizing content libraries within a distributed computer system, wherein execution of the program instructions by one or more processors of a computer system causes the one or more processors to perform steps comprising:
   receiving a trigger signal to initiate a content synchronization of a subscribed content library in the distributed computer system with a publishing content library in the distributed computer system, the publishing content library including at least a consumable software item and metadata of the consumable software item;
   based on the metadata, determining whether the consumable software item of the publishing content library can be replicated at the subscribed content library using the most efficient data replication process from a plurality of data replication processes;
   if the consumable software item of the publishing content library can be replicated at the subscribed content library using the most efficient data replication process, replicating the consumable software item of the publishing content library at the subscribed content library using the most efficient data replication process; and
   if the consumable software item of the publishing content library cannot be replicated at the subscribed content library using the most efficient data replication process, replicating the consumable software item of the publishing content library at the subscribed content library using the next most efficient data replication process of the plurality of data replication processes; and
   performing a re-synchronization process between the subscribed content library and the publishing content library by synchronizing a metadata in the subscribed content library with a metadata of an updated consumable software item of the publishing content library and using storage location information in the metadata of the updated consumable software item to determine whether the updated consumable software item of the publishing content library can be replicated at the subscribed content library using the most efficient data replication process.

11. The non-transitory computer-readable storage medium of claim 10, wherein the most efficient data replication process is a storage copy process to copy the consumable software item of the publishing content library stored in first storage to second storage associated with the subscribed content library.

12. The non-transitory computer-readable storage medium of claim 11, wherein determining whether the consumable software item of the publishing content library can be replicated at the subscribed content library using the most efficient data replication process includes determining whether a cluster management server associated with the subscribed content library has access to the first storage in which the consumable software item of the publishing content library is stored.

13. The non-transitory computer-readable storage medium of claim 10, wherein the next most efficient data replication process is a data streaming process based on HTTP to stream the consumable software item from the publishing content library to the subscribed content library.

14. The non-transitory computer-readable storage medium of claim 10, wherein the steps further comprise, if replication of the consumable software item at the subscribed content library fails using the most efficient data replication process, replicating the consumable software item of the publishing content library at the subscribed content library using the next most efficient data replication process.

15. The non-transitory computer-readable storage medium of claim 10, wherein the consumable software item is a virtual machine template or a virtual application template.

16. The non-transitory computer-readable storage medium of claim 10, wherein the consumable software item is stored in the publishing content library as Open Virtualization Format (OVF) file format.

17. The non-transitory computer-readable storage medium of claim 10, wherein the metadata of the consumable software item is stored in the publishing content library and the subscribed content library as one or more JavaScript Object Notation (JSON) files.

18. A management server supported by hardware in a distributed computer system comprising:
   memory;
   a processor, when program instructions in the memory are executed, is configured to:
      receive a trigger signal to initiate a content synchronization of a subscribed content library in the distributed computer system with a publishing content library in the distributed computer system, the publishing content library including at least a consumable software item and metadata of the consumable software item;
      based on the metadata, determine whether the consumable software item of the publishing content library can be replicated at the subscribed content library using the most efficient data replication process from a plurality of data replication processes;
      if the consumable software item of the publishing content library can be replicated at the subscribed content library using the most efficient data replication process, replicate the consumable software item of the publishing content library at the subscribed content library using the most efficient data replication process; and if the consumable software item of the publishing content library cannot be replicated at the subscribed content library using the most efficient data replication process, replicate the consumable software item of the publishing content library at the subscribed content library using the next most efficient data replication process of the plurality of data replication processes; and performing a re-synchronization process between the subscribed content library and the publishing content library by synchronizing a metadata in the subscribed content library with a metadata of an updated consumable software item of the publishing content library and using storage location information in the metadata of the updated consumable software item to determine whether the updated consumable software item of the publishing content library can be replicated at the subscribed content library using the most efficient data replication process.

19. The management server of claim 18, wherein the most efficient data replication process is a storage copy process to copy the consumable software item of the publishing content library stored in first storage to second storage associated with the subscribed content library.

20. The management server of claim 19, wherein the processor is further configured to determine whether a cluster management server associated with the subscribed content library has access to the first storage in which the consumable software item of the publishing content library is stored.

21. The management server of claim 19, wherein the next most efficient data replication process is a data streaming process based on HTTP to stream the consumable software item from the publishing content library to the subscribed content library.

22. The management server of claim 18, wherein the processor is configured to, if replication of the consumable software item at the subscribed content library fails using the most efficient data replication process, replicating the consumable software item of the publishing content library at the subscribed content library using the next most efficient data replication process.

23. The management server of claim 18, wherein the consumable software item is a virtual machine template or a virtual application template.

24. The management server of claim 18, wherein the consumable software item is stored in the publishing content library as Open Virtualization Format (OVF) file format.

25. The management server of claim 18, wherein the metadata of the consumable software item is stored in the publishing content library and the subscribed content library as one or more JavaScript Object Notation (JSON) files.

* * * * *